United States Patent [19]

Stirling et al.

[11] 3,924,712
[45] Dec. 9, 1975

[54] HYDRAULIC LIQUID OPERATED AND COOLED FRICTION BRAKE

[75] Inventors: Walter Robert Stirling, Buxton; Christopher Robinson Ellis, Chinley; Brian Carol Silvester, Leamington Spa, all of England

[73] Assignee: Ferodo Limited, Manchester, England

[22] Filed: Sept. 27, 1974

[21] Appl. No.: 510,126

[30] Foreign Application Priority Data

| Sept. 29, 1973 | United Kingdom | 45668/73 |
| Oct. 11, 1973 | United Kingdom | 47653/73 |
| Oct. 22, 1973 | United Kingdom | 49149/73 |
| Nov. 2, 1973 | United Kingdom | 51054/73 |
| Dec. 5, 1973 | United Kingdom | 56362/73 |
| Mar. 8, 1974 | United Kingdom | 10423/74 |
| Mar. 9, 1974 | United Kingdom | 10660/74 |
| Apr. 25, 1974 | United Kingdom | 18082/74 |

[52] U.S. Cl. ........................ 188/264 F; 192/113 B
[51] Int. Cl.² .................................... F16D 65/853
[58] Field of Search ........... 188/71.6, 264 D, 264 E, 188/264 F, 264 P; 137/495; 192/113 B

[56] References Cited
UNITED STATES PATENTS

| 1,430,505 | 9/1922 | Hinchman | 137/495 |
| 2,775,328 | 12/1956 | Yokel | 188/264 P |
| 2,971,612 | 2/1961 | Graber | 188/264 P |
| 3,259,216 | 7/1966 | Klaus et al. | 188/264 F |
| 3,776,332 | 12/1973 | D'Assignies | 188/264 F |

FOREIGN PATENTS OR APPLICATIONS

| 450,762 | 8/1949 | Italy | 188/264 F |
| 1,289,956 | 2/1962 | France | 188/264 F |
| 1,291,722 | 10/1972 | United Kingdom | 188/264 F |

*Primary Examiner*—Trygve M. Blix
*Assistant Examiner*—Edward R. Kazenske
*Attorney, Agent, or Firm*—Cushman, Darby & Cushman

[57] ABSTRACT

An hydraulically operable friction brake wherein the hydraulic liquid also provides the medium for removal of heat during operation, which brake comprises a casing within which are mounted a rotary member and a pressure-operable retarding device arranged and adapted to act upon the rotary member to generate retarding torque, a pump for circulating hydraulic liquid through two separate fluid circuits between the pump and the retarding device, one of the circuits being an actuating circuit arranged and adapted to operate the retarding device; operation of the brake is controlled by a valve device comprising a valve member, a first valve element secured to said member, a second valve element slidable on said member and urged away from the first valve element by a spring so constituting a pressure sensitive device arranged and adapted to control distribution of flow of hydraulic liquid between the two circuits, and a device for equilibrating hydraulic pressure across the valve device.

12 Claims, 14 Drawing Figures

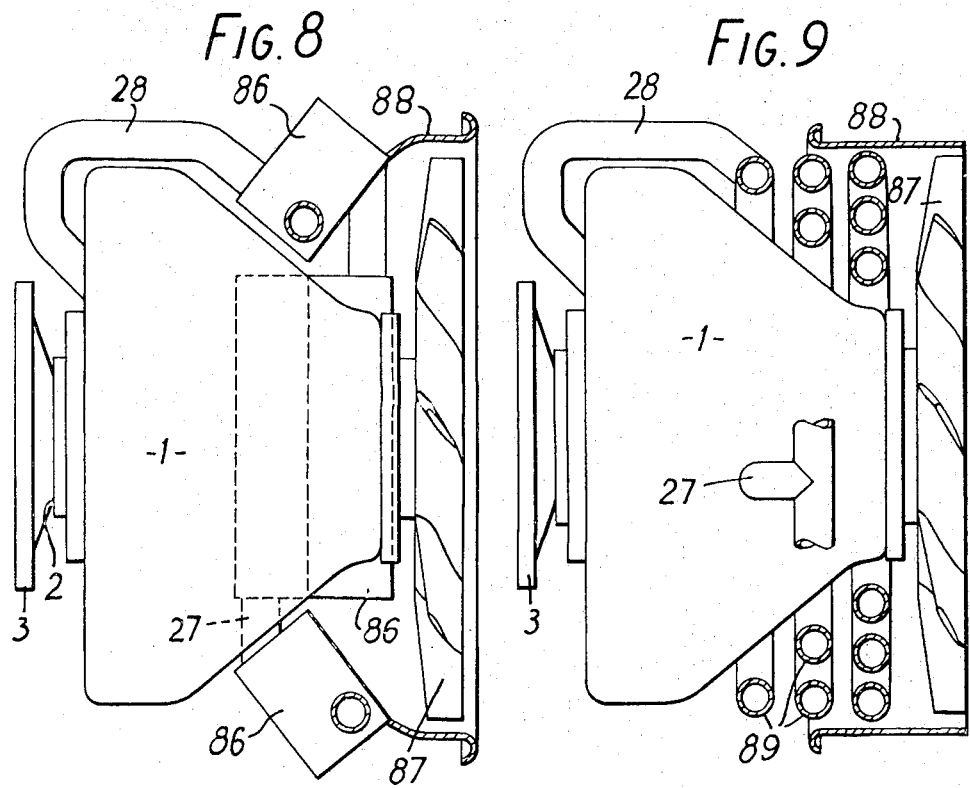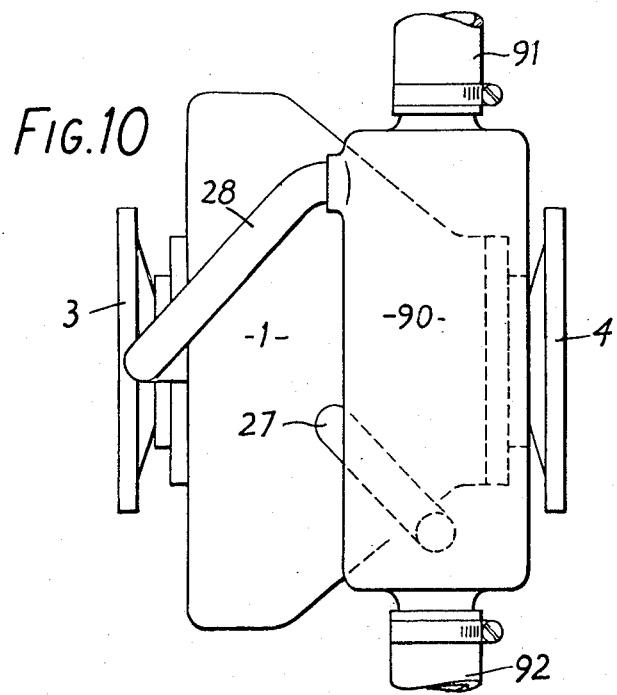

HYDRAULIC LIQUID OPERATED AND COOLED FRICTION BRAKE

This invention concerns improvements in or relating to hydraulically-operated friction brakes, more particularly of the kind referred to as vehicle retarders.

Various forms of vehicle retarders are known, for example, those disclosed in Italian Pat. No. 450,762 (wherein the retarding force is proportional to the setting of a manually settable valve) and our U.K. Patent Specification No. 1,291,722 (wherein the retarding force is proportional to the speed of the vehicle).

An object of the present invention is to improve the overall efficiency of such vehicle retarders.

According to the present invention, we provide an hydraulically-operable friction brake of the kind wherein the hydraulic liquid also provides the medium for removing the heat generated during operation of the brake, comprising (i) a casing, (ii) a rotary member mounted in the casing, (iii) a pressure-operable retarding device arranged and adapted to act upon the rotary member to generate retarding torque, (iv) a pump for circulating hydraulic liquid, (v) two separate fluid circuits provided between the pump and the retarding device, one being arranged and adapted to operate the retarding device and the other being arranged and adapted to cool the hydraulic liquid and (vi) valve means comprising (a) a valve member, (b) a first valve element secured to said member, (c) a second valve element slidable on said member and urged away from the first valve element by a spring and constituting pressure sensitive means arranged and adapted to control distribution of flow of hydraulic liquid between the two circuits, and (d) means for equilibrating hydraulic pressure across the valve means.

One means for equilibrating hydraulic pressure across the valve is the provision of a passage in the vlave member, permitting flow therethrough of hydraulic fluid in said one circuit; a more preferred means of achieving this purpose is to provide a by-pass from the outlet of the pump to a surface of said first valve element remote from the second valve element, whereby the by-pass is opened on actuation of the valve means.

Preferably the other of said circuits is in part external of the casing and preferably the external part includes cooling means for the hydraulic liquid, preferably heat exchange means mounted on the casing.

Other preferred features of the present invention will become apparent from the following description of a preferred embodiment described by way of example with reference to the accompanying diagrammatic drawings, wherein:

FIGS. 8, 9 and 10 are side views of retarders with different forms of heat exchange means;

In the various drawings, the same numerals are used to identify the same or similar parts, and primed numerals are used to identify equivalent parts.

Figure 1:
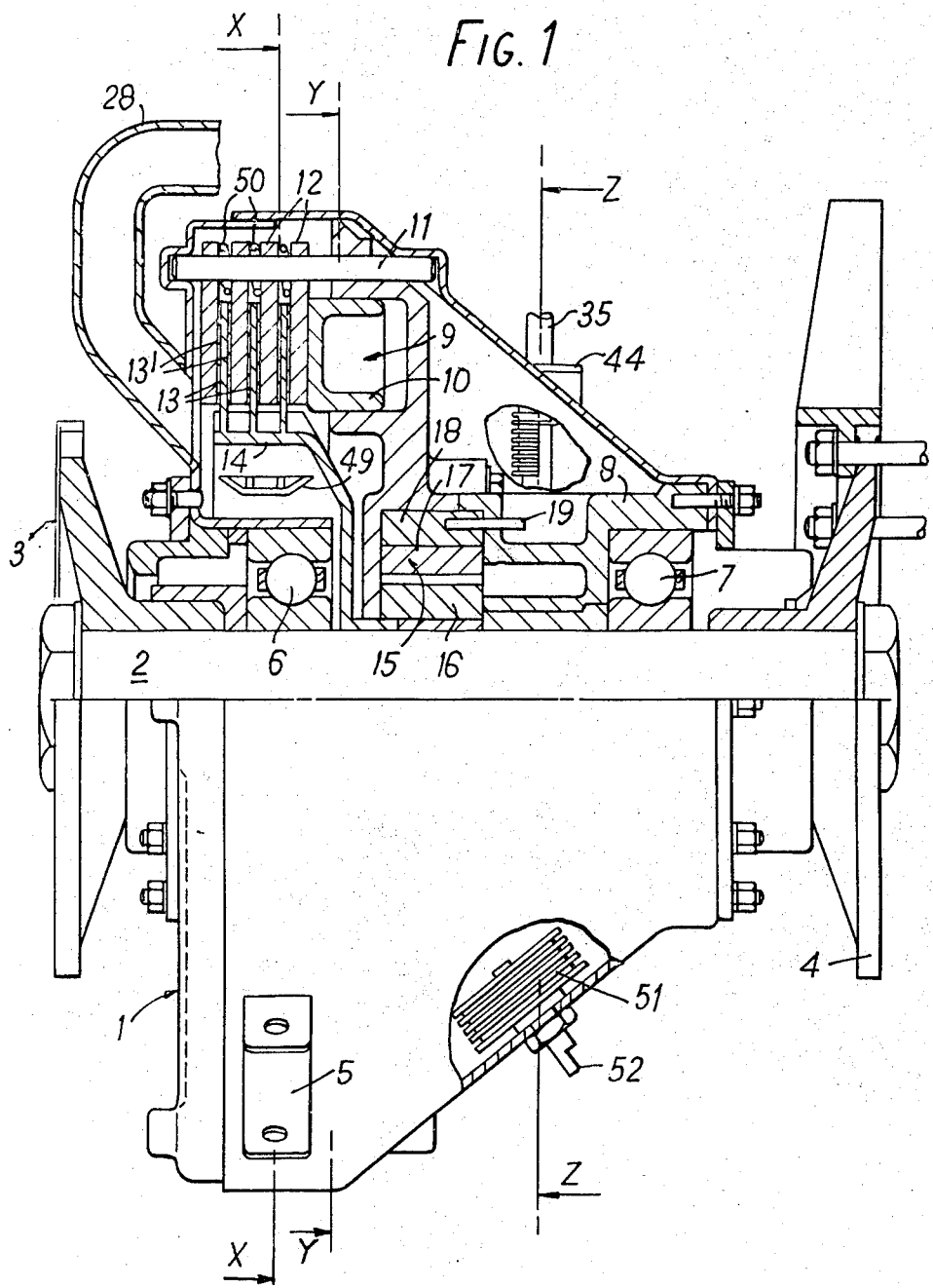
FIG. 1 is a side elevation, partly in section, of an hydraulically operable vehicle retarder.
Figure 2:
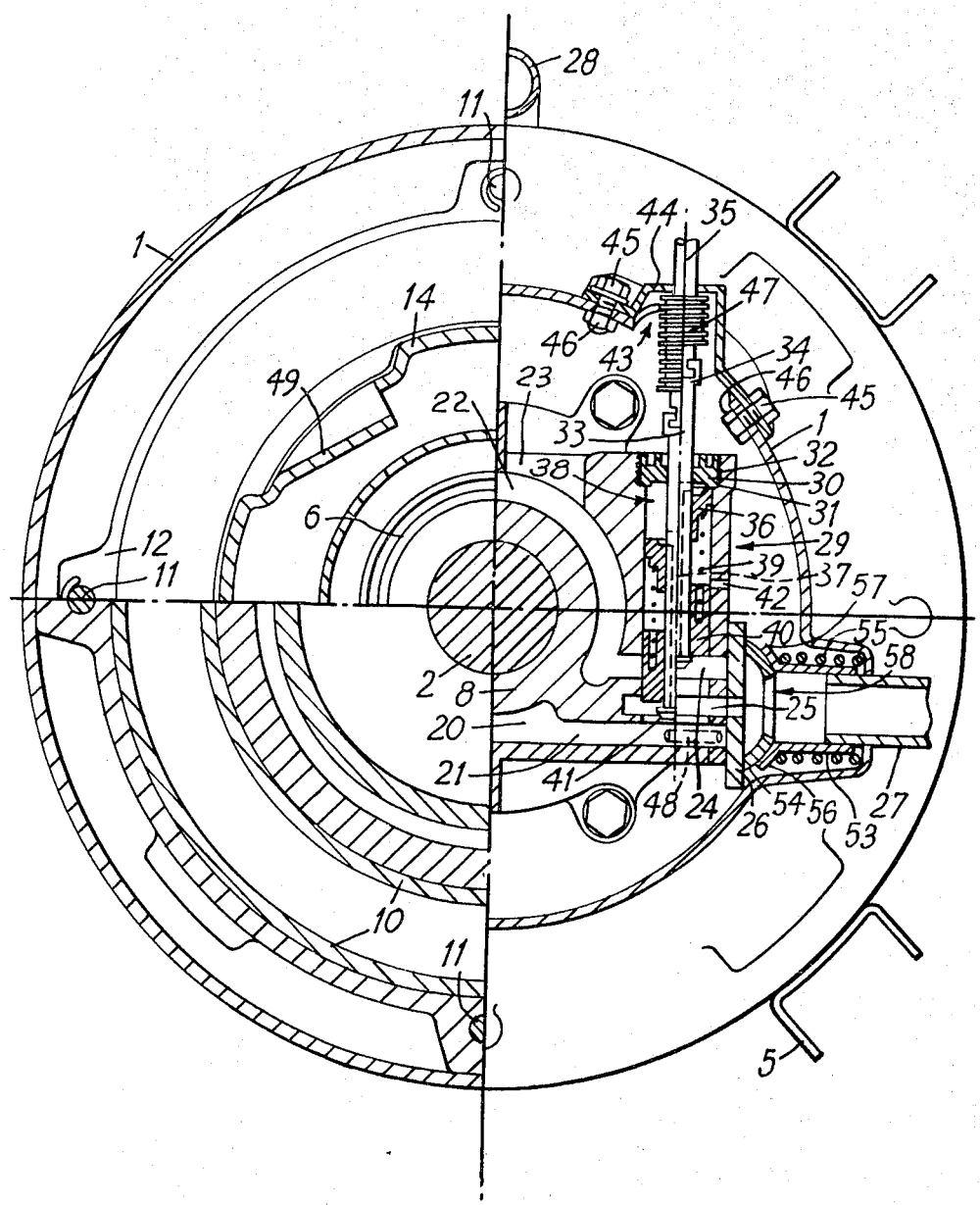
FIG. 2 is a cross-section of the retarder illustrated in FIG. 1, the right-hand half of FIG. 2 being a half-section on line Z—Z of FIG. 1, the upper left-hand quadrant being a quarter section on the line Y—Y of FIG. 1.

Referring to FIGS. 1 and 2 of the drawings, the vehicle retarder comprises a casing 1 enclosing a rotary member in the form of a shaft 2 having flanged ends 3, 4, for mounting as part of the propeller shaft of a vehicle. Lugs 5 are provided for securing the casing to a vehicle chassis. The shaft 2 is carried in bearings 6, 7 located in the casing and spaced apart by means including a shaped body member 8 provided with an annular groove 9 in which is slidably mounted an annular piston 10.

The casing 1 carries four circumferentially spaced hard steel pins 11 which are disposed parallel to the axis of the shaft 2 and on which are slidably mounted counter plates 12, interleaved with friction plates 13, each carrying friction linings 13', internally splined onto external splines on a hub 14 which is secured to the shaft 2 by electron beam welding, whereby forward movement of the piston 10 (i.e., to the left as shown in FIG. 1) will bring the counter-plates 12 (fixed against rotation) and friction plates 13 (which are rotatable with the shaft 2) into engagement by relative axial sliding thereof on the pins 11 and hub 14, respectively. The counter plates 12 are biased apart by means of springs 50.

An oil pump 15 is located in a cavity formed in the body member 8 and is of the internal/external toothed gear type in which an extenally toothed gear 16 is driven from the hub 14. The gear 16 meshes fully at one point with an eccentric internally toothed gear 17 and the two gears are just out of mesh at a point diametrically opposite the fully meshed point. The gears 16 and 17 have different numbers of teeth, and the latter runs in a steel ring 18 prevented from rotating by a pin 19. The pump 15 has an outlet passage 20, feeding an outlet port 21 and an inlet passage 22, fed by an opening 23 into the interior of the casing 1 and by an inlet port 24. Between the inlet and outlet ports 24 and 21, there is an intermediate port 25. All these ports are of substatially rectangular section and are parallel. The ends of the ports 21, 24 are closed by a plate 26 having an opening corresponding to the intermediate port 25. An outlet pipe 27 is welded through the casing 1 and leads to an external cooling part of the non-actuating circuit, with re-entry to the casing through conduit 28.

Flow of oil from the outlet port 21 to the intermediate port 25 and inlet port 24 is controlled by valve means operating in a bore 29 formed in the body member 8 and passing through the walls between the ports 21, 24 and 25. The bore 29 is closed by a plug 30 located by a register 31 and a thread 32 in the body member 8. A valve member in the form of rod 33, guided and sealed by a bore in the plug 30, has a T-slot head 34 in which a T-ended actuator rod 35 is engaged to provide limited radial movement in all directions but with little relative axial movement, to accommodate any relative movement between the casing 1 and the body member 8. A first valve element in the form of an upper piston 36 is fastened to the valve rod 33 and is a sliding sealing fit in the bore 29. A central passage 37 in the valve rod 33 interconnects the outlet port 21 with a space 38 above the upper piston 36, and a precompressed spring 39, reacting on the upper piston 36, urges a second valve member in the form of lower piston 40, which is slidable on the valve rod 33, against a circlip 41 whereby the lower piston is sensitive to variations in the pressure of oil in the intermediate port 25. The space between the pistons 36, 40 is vented by an orifice 42 in the body member 8. The distance between the pistons 36, 40 is such that the lower piston 40 may move upwards to vent the pump outlet to its inlet should the outlet pipe 27 become blocked.

The valve rod 33 and plug 34 with pistons 36 and 40 can be inserted and withdrawn through an aperture 43 positioned in the casing 1 opposite the bore 29, the aperture 43 being closed by a closure 44 sealed to the casing 1 by screws 45 and captive nuts 46. The closure 44 serves as a guide for the actuator rod 35 and as a mounting for suitable actuator means (not shown) such as a solenoid or a hydraulic or pneumatic actuator. The actuator rod 35 is sealed to the closure 44 by a gland in the form of an extensible metallic bellows 47.

An orifice 48 provides communication between the outlet port 21 and the annular groove 9 to complete the actuating circuit; scoops 49 are provided in the hub 14 to facilitate circulation of the hydraulic fluid in the non-actuating circuit.

In use, the vehicle retarder is mounted in a vehicle with the flanged ends 3, 4 of the shaft 2 secured to appropriate propeller shaft portions, and the whole of the retarder, including the external cooling circuit, is filled with hydraulic oil. The retarder is brought into and out of operation by axial movement of the actuator rod 35. In FIG. 2, the right-hand half of the valve means operating in the bore 29 shows conditions when the retarder is inoperative; and the left-hand half shows the operative condition.

In operation of the retarder, the shaft 2 rotates at a speed corresponding to the speed of the vehicle and causes oil to be discharged by the pump into the outlet port 21, from which the oil passes to the intermediate port 25. Some of the oil passes out through the outlet pipe 27, through the external cooling part of the non-actuating circuit and returns through the conduit 28, from which it passes outwards between the plates 12, 13 and hence back to the opening 23. The remainder of the oil passes up the bore 29 to the inlet port 24 and hence into the pump. This provides a minimum pressure drop between the pump inlet and outlet, reducing power loss.

Axial movement, from the inoperative position, of the actuator rod 35, valve rod 33 and pistons 36 and 40 first closes off the inlet port 24, so that all the oil has to pass out of the intermediate port 25 through the plate 26. As the piston 40 is moved further into the intermediate port 25, it causes restriction to the flow of oil from the outlet port 21 to the intermediate port 25 so that the pressure of oil in the outlet port 21 rises by an amount dependant on the actual position of the actuator rod 35. This pressure is communicated to the annular groove 9 through the orifice 48, so that an axial force is generated on the piston 10 which accordingly presses the plates 12, 13 together thereby generating a braking or retarding torque on the shaft 2.

Due to the oil pressure on the end of the lower piston 40, it is moved upwards against the force of the spring 39 to a position of equilibrium. Increase in the speed of rotation of the shaft 2 and of the pump 15 causes the oil flow to increase correspondingly, which tends to raise the pressure in the outlet port 21. (If the spring 39 is of low rating, the piston 40 will move up to an extent which will maintain substantially constant the pressure in the outlet port 21, and therefore the braking torque, over a wide speed range. At the other extreme, if the spring is of high compressive rating, there will be little movement of the piston 40 so that the pressure will tend to be proportional to the square of the speed of the shaft 2. By choosing intermediate values of rating and appropriate amount of precompression of the spring 39, the torque can be arranged to rise with speed, with intermediate characteristics).

Oil is also transmitted up the central passage 37 to produce a downward pressure on the upper face of the piston 36, whereby axial force on the valve rod 33 is reduced. Upward movement of the actuator rod 35 reduces the retarding torque.

Referring further to FIG. 2, the retarder preferably includes a pressure relief device for the cooling circuit, in the form of a pressure-sensitive means arranged and adapted to vent into the internal circuit hydraulic fluid from the cooling circuit on attainment in the latter of a predetermined maximum pressure. The pressure relief device comprises a close-fitting sleeve 53 telescopically slidable on the outlet pipe 27 and urged against a part-spherical cup 54 by means of a compression spring 55 acting on a collar 56 and on the casing 1, to hold the cup 54 against the plate 26. The sleeve 53 has a flared end 57 matching the contour of the cup 54 and the latter has an orifice 58 of a diameter corresponding to the internal diameter of the outlet pipe 27.

The part-spherical configuration of the cup 54 and flared end 57 of the sleeve permits accommodation of malalignment between the outlet pipe 27 and the plate 26 and of relatively thermal expansion.

The degree of compression of the spring 55, (i.e., the force with which it urges the sleeve 53 against cup 54) is predetermined so that when the oil flow through the outlet pipe reaches a corresponding undesirably high pressure (as may be caused by blockage), the cup 54 will move away from the plate 26 against the force of the spring, to vent oil into the internal hydraulic circuit within the casing, thereby inhibiting further increase in the oil pressure in the external part of the circuit.

The vehicle retarder preferably also includes, as shown in FIG. 1, a metallic bellows device 51 (omitted from FIG. 2 for clarity) secured at one end within the casing so as to be immersed in the hydraulic liquid and having a rod 52 secured to its free end and freely passing through the fixed end and through the casing so as to be axially slidable on expansion and contraction of the bellows 51. The interior of the bellows is sealed against communication with the oil in the casing but is vented to atmosphere around the rod 52, and the bellows 51 are made sufficiently "springy" in an axial direction as to tend to maintain the bellows expanded and to pressurise the oil within the casing and thereby maintain it at a predetermined pressure above atmospheric, during periods of non-operation of the retarder. The bellows device 51 also accommodates, to a minor extend, volume changes caused, for example, by thermal expansion of the retarder or of the oil therein, or by displacement of the oil on operation of the actuator. These effects, however, are reduced as the space within the system (necessary to permit expansion of the hydraulic liquid on heating) is increased, the size of this space being dependent on the volume of hydraulic liquid used, and on the volume coefficient of expansion of the liquid. The rod 52 may be arranged to operate electrical circuitry whereby warning may be given that leakage has occurred; leakage will cause the bellows to expand, thereby causing axial movement of the rod. Warning of the attainment of excessive pressure may be given in similar manner.

Figure 3:
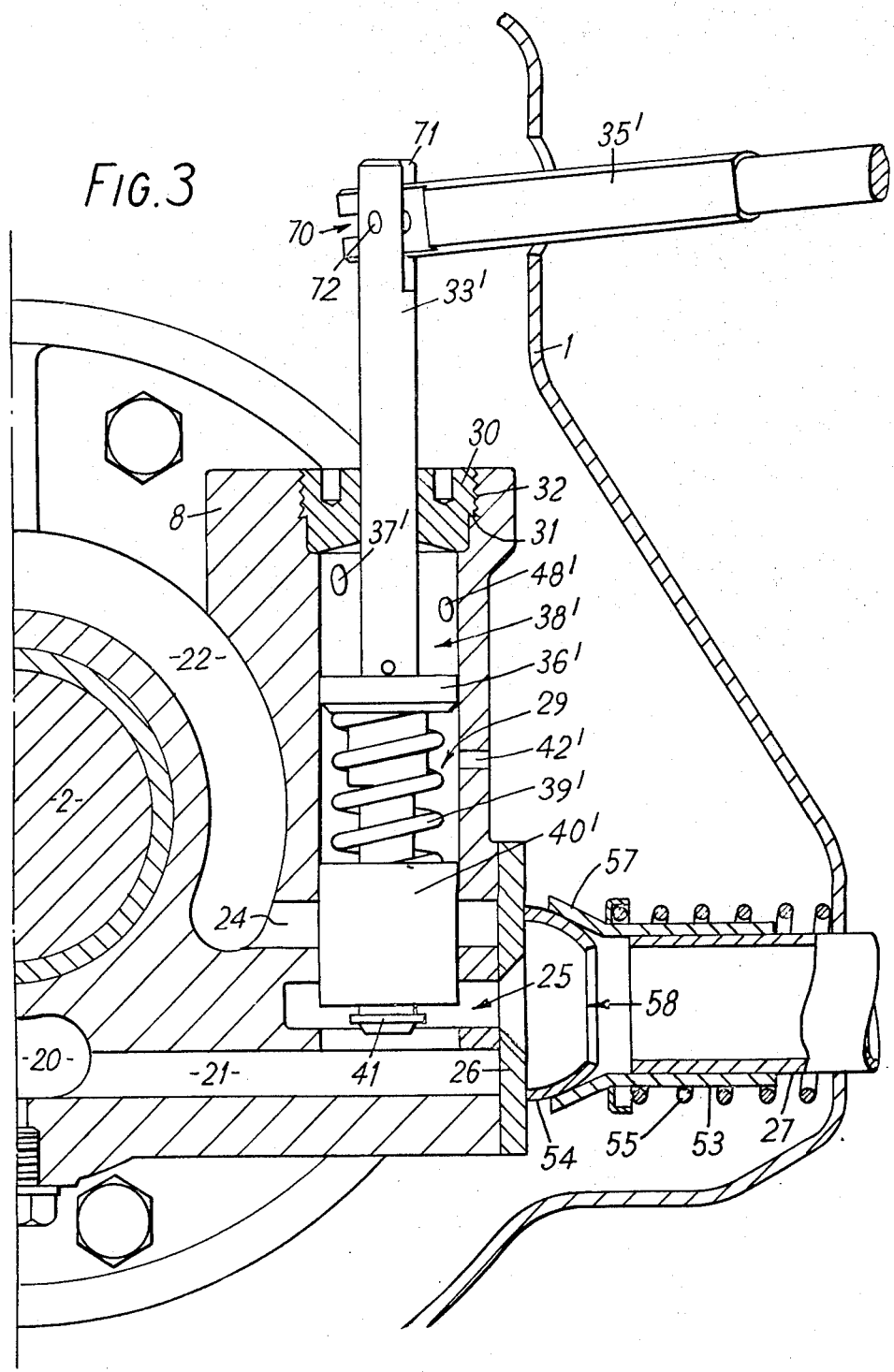
FIG. 3 is a cross-sectional elevation on an enlarged scale of a modification of the valve means of FIG. 2.
Figure 4A:
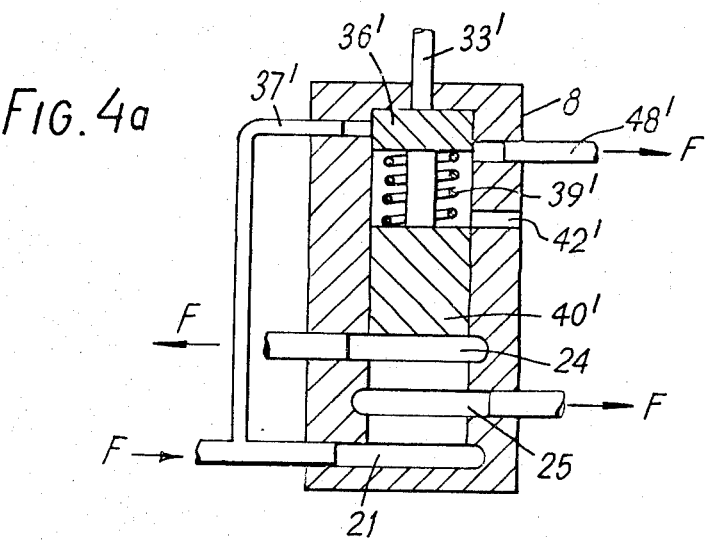
FIGS. 4a and 4b are diagrammatic cross-sections of the valve means of FIG. 3, showing the directions of flow of the hydraulic fluid in the "off" and "on" positions, respectively.
Figure 4B:
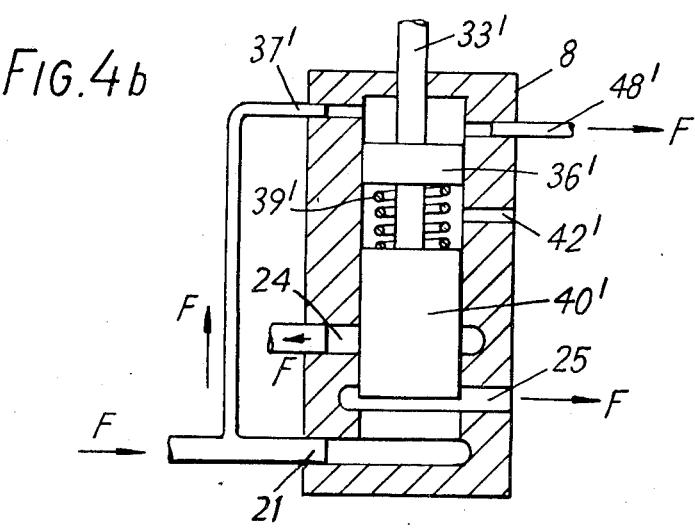

FIGS. 3 and 4 illustrate a modification of the valve means described above with reference to FIGS. 1 and 2. At mid to high speeds of operation of the retarder of FIGS. 1 and 2, the hydraulic liquid in the pump outlet port 21 may be subjected to a pressure sufficiently high to operate the retarding device, owing to the bellows connection port 48 being in the outlet port 21. This disadvantage arises when the passage 37 cannot be provided with a sufficient large diameter to effect the desired pressure balance across the valve means. In the modification shown in FIGS. 3 and 4, a by-pass 37' is formed in the body portion 8, connecting the outlet port 21 to the top of the bore 29, and a port 48' provides fluid communication from the top of the bore 29 to the chamber 9 of the retarding device (or to a bellows piston as referred to hereafter). The relative positions of the port of by-pass 37' and the port 48' are shown in FIGS. 4a and 4b. In the "off" position shown in FIG. 4a, hydraulic liquid flows from the outlet 21 through by-pass 37' to the side of the top piston 36', where the flow is blocked. The port 48' remains open to the space formed between the top piston 36' and lower piston 40' and hence is vented to the interior of the casing 1 through orifice 42'. In operation of this modification, the top piston 36' moves downwards with the actuating movement of the valve member 33' to open the by-pass 37'. Further movement to the position shown in FIG. 4b opens the port 48' so that the hydraulic fluid flows directly to the retarding device, and the operation of the retarder proceeds as described above with reference to FIGS. 1 and 2. The arrows F show the directions of flow of the hydraulic fluid, in FIGS. 4a and 4b. Since the by-pass 37' may be formed to any desired size in the body portion 8, accurate pressure balancing of the valve means is more easily obtained than with the embodiment described with reference to FIG. 2.

Figure 5:
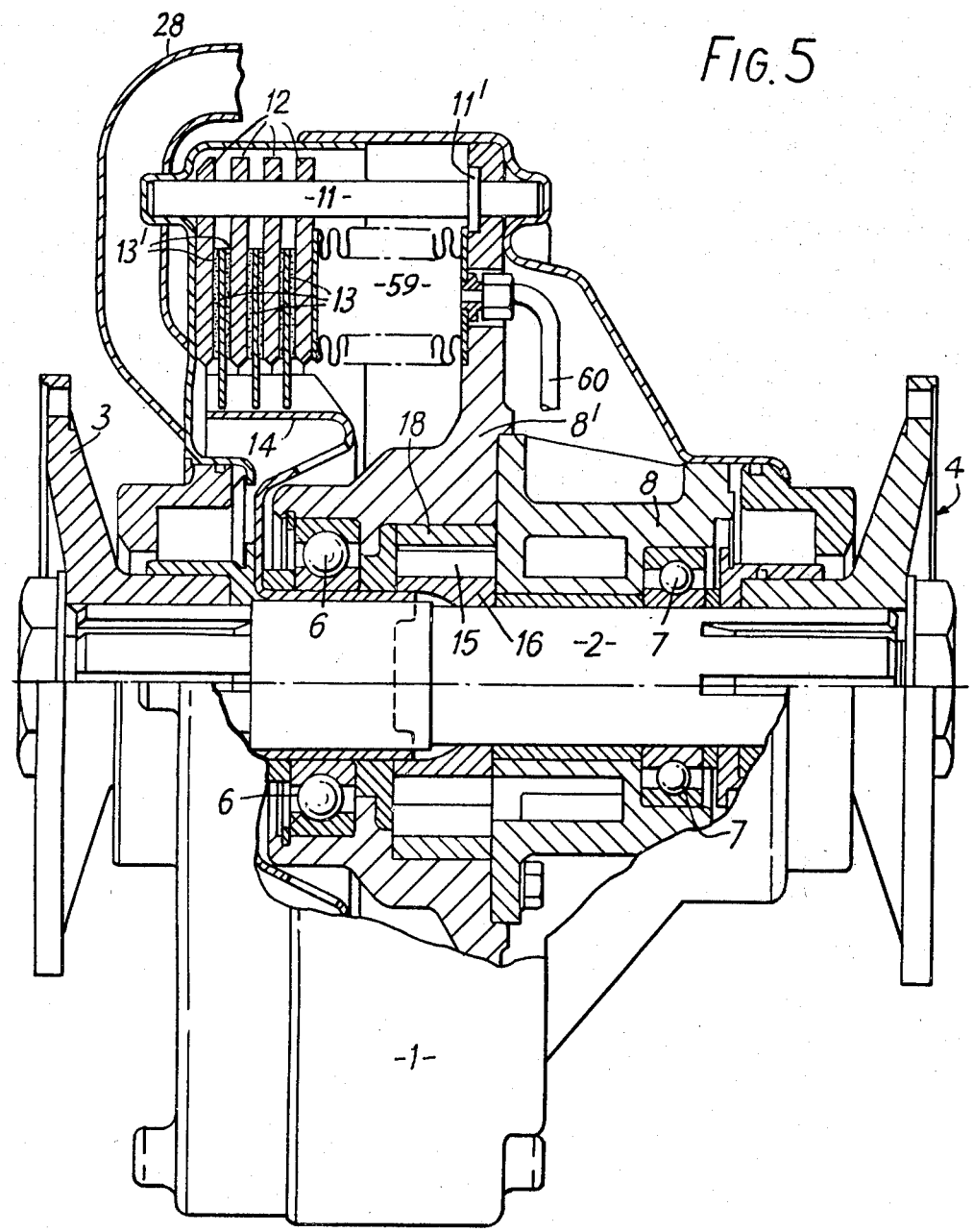
FIG. 5 is a side elevation, partly in section, of a modification of the retarder of FIG. 1.

Referring now to FIG. 5, a modification of the retarder shown in FIGS. 1 and 2 includes, in place of annular piston 10, an annular bellows piston 59, adapted to bear at one end on the innermost counter plate 12, and carried on a forward body portion 8'. An oil supply line 60 is connected to the other end of the bellows piston to supply oil to the interior thereof from the orifice 48 shown in FIG. 2, or 48' of FIG. 3, or from some other suitable supply device.

In operation of this modification, actuation of the retarder causes oil to be supplied at pressure to the interior of the bellows piston 59 causing it to expand and to force the counter plates 12 into engagement with the respective surfaces 13' of the friction plates 13. Reduction of the oil pressure on completion of the retarding operation causes the bellows piston to retract under the influence of its inherent axial springiness to allow disengagement of the friction and counter plates.

Since a considerable thrust can be generated by the shaft 2, the pins 11 can be flanged as shown at 11', so that the thrust is transmitted through the body portion 8' flanges 11', and pins 11 to the front of the casing 1, rather than through the hub 14 to the friction plates.

Since the use of a bellows piston eliminates the need for close tolerances, as between a piston and cylinder, the risk of jamming of the retarder in the "on" or "off" position, due, for example to thermal expansion or distortion of the piston 10, can be virtually eliminated.

Figure 6:
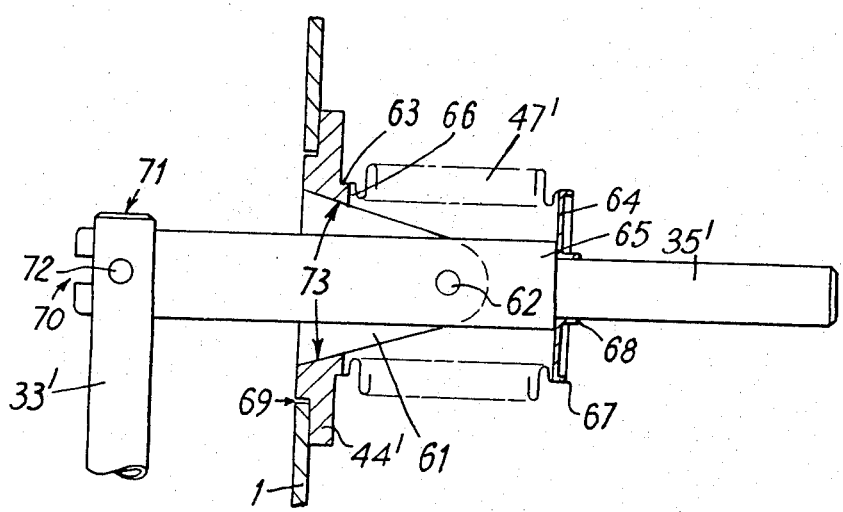
FIG. 6 is an alternative form of actuator assembly.

As an alternative to the actuator assembly of T-ended actuator rod 35, bellows 47 and cover 44, the modification of FIG. 6 may be used. This consists of a body portion 44' having trunnions 61 in which an actuating lever 35' mounted for pivotal movement in a single plane, by means of pin 62, and a substantially cylindrical stainless steel bellows seal 47', through which the lever 35' passes. The bellows seal 47' engages at one end against an annular shoulder 63 on the body portion and is closed at its other end by an annular end plate 64 mounted on the lever 35' and abutting a shoulder 65 on the lever 35'. The assembly is welded at the lines of abutment 66, 67 and 68 so that when the assembly is mounted in register with an aperture 69 in the wall of the casing 1, the interior of the bellows seal is sealed from atmosphere. The inner end of the lever 35' is forked at 70 and engages in the forked end 71 of valve member 33', being restrained therein by means of a pin 72. To avoid straining the assembly and in particular the bellows 47', the body portion 44' is formed with internal buffer surfaces 73 to limit the pivotal movement of the lever 35'.

Figure 7:
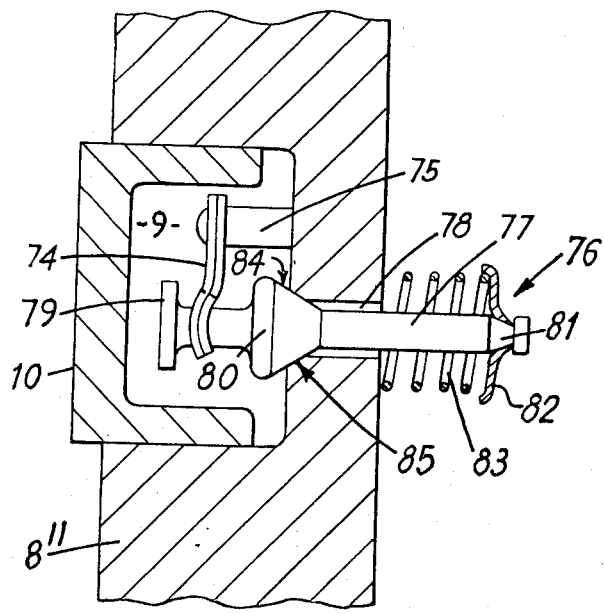
FIG. 7 is a cross-section elevation of a thermal safety device.

A retarder according to this invention may include a thermally sensitive element adapted to reduce or cause reduction of the hydraulic pressure and hence the retarding force when the hydraulic liquid reaches a predetermined elevated temperature. A suitable element, mounted in chamber 9, is shown in FIG. 7, and comprises a bimetallic strip 74 mounted at one end on a post 75 secured to the body portion 8'', and slotted at its free end to receive a valve member, generally indicated at 76, consisting of a stem 77 extending through an aperture 78 in the body portion 8'', a mushroom head 79, a conical valve element 80, a groove 81 in the stem 77, and a collet 82 received in the groove and restraining a precompressed spring 83 tending to retain the valve seating 84 against a corresponding seating 85 on the body portion 8''.

At normal operating temperatures, the slotted end of the bimetallic strip 74 is spaced away from the mushroom head 79, and is arranged to contact the mushroom head 79 at a temperature of the hydraulic liquid above which normal operation is endangered, so that further increase in temperature of the hydraulic liquid will cause the bimetallic strip 74 to lift the conical valve element 80 from its seating, thereby permitting the hydraulic liquid to escape from the chamber 9 and the pressure therein to fall. This will result in a reduction in the retarding torque temperature rise is limited.

The vehicle retarder may include cooling means in the external part of the non-actuating circuit; FIGS. 8, 9 and 10 show suitable alternative means comprising heat exchangers mounted on the retarder casing. In FIG. 8, four equally spaced oil-to-air heat exchangers 86 are provided, cooled by a fan 87 secured to one end of the shaft 2. A shroud 88 is provided to optimise the air flow from the fan 87. In FIG. 9 the cooling means comprises substantially concentric rings of oil-to-air heat exchanger tubing 89, which may be provided with external fins, wires or baffles for extending the cooling circuit. In FIG. 10, the cooling means comprises an oil-to-water heat exchanger 90 mounted on the casing, water, anti-freeze solution or other liquid coolant being supplied and returned through pipes 91 and 92, for example from the vehicle's main engine cooling system. By mounting the cooling means on the retarder easing, flexible couplings for circulation of the hydraulic liquid can be omitted.

The normal propeller shaft of a vehicle such as the tractor portion of an articulated lorry is short compared, for example, with the propeller shaft of a rigid, long-wheel-base lorry. If a retarder of the type referred to above is firmly mounted on the chassis of a 'short' vehicle, or to its gearbox or driven axle, the residual length available for the propeller shaft may be undesirably (or, even, unacceptably) short, since normal verticla movement of the driven axle relative to the chassis could impose excessive angles of articulation in the universal joints of the shortened propeller shaft and excessive plunge movements of the propeller shaft splines.

Figure 11:
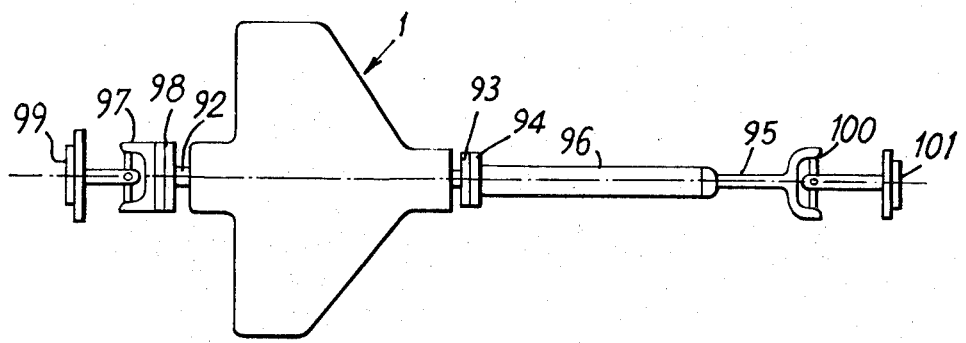
FIG. 11 is a diagrammatic elevation of a vehicle retarder mounted on a propeller shaft.
Figure 12:
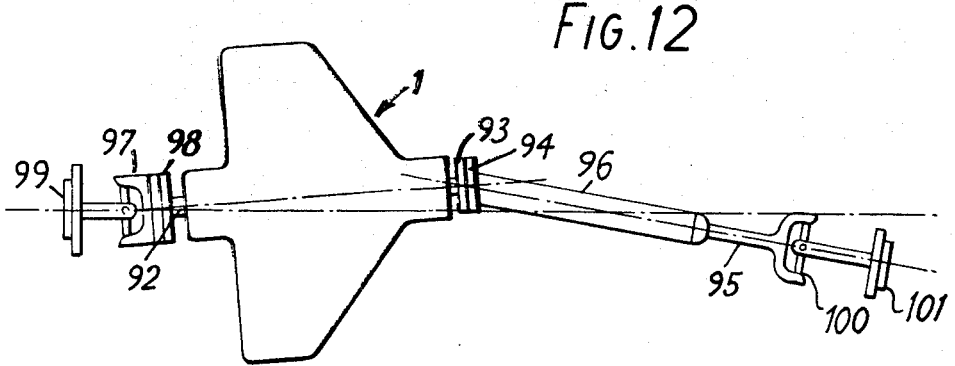
FIG. 12 is a view similar to FIG. 11, showing exaggerated mis-alignment of the propeller shaft portions.
Figure 13:
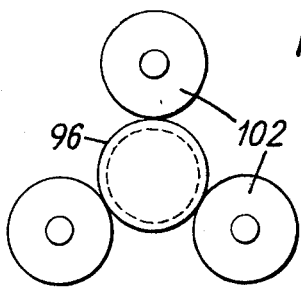
FIG. 13 is a cross-sectional elevation of a device for centering a propeller shaft.

In a further modification, illustrated in FIGS. 11 to 13, the rotary shaft 2 passing through the casing and being attachable to a propeller shaft is substituted by the propeller shaft itself, or a portion thereof. By virtue of this arrangement, a normal length between universal joints may be maintained. Referring to FIG. 11, a first propeller shaft portion 92 is mounted for rotation in retarder casing 1 and is coupled by flange 93 to flange 94 of a splined second propellershaft portion 95 shrouded by sahft tube 96. A first universal coupling 97 on the free end flange 98 of the first propeller shaft portion 92 carries a flange 99 for connection of the retarder/-propeller shaft combination to the gear box of a tractor for an articulated lorry, and a second universal coupling 100 is provided on the free end of second propeller shaft portion 95 and carries a coupling flange 101 for connection to, for example, a flanged driven shaft in a differential gear mechanism carried on the rear axle assembly of the tractor. It is important that the axis of the first propeller shaft portion be colinear, or very nearly so, with the axis of rotation of the coupling flange 101.

FIG. 12 shows, in much exaggerated manner, the effect of the flange 94 being welded at an angle to the tube 96, or otherwise disposed so that the surface of flange 94 registering with the corresponding surface of flange 93, is not normal to the axis of the second propeller shaft portion. A similar effect is obtained if the flange 93 is wrongly disposed. When a misaligned system, such as that illustrated in FIG. 12, is rotated, it will be out of balance and will be subject to unequal centrifugal forces generated by "wobbling," in a rotary sense, of the nonrotary retarder casing 1.

The condition shown in FIG. 12 can be alleviated by positively locating the retarder casing 1 on a mounting, rotating the first propeller shaft portion 92 (before connection to the second portion 95), and performing a turning operation with a cutting tool on the surface(s) of flange 93. Similarly, the second propeller shaft portion is secured to a mounting by means of flange 101 and is centered at a location adjacent to flange 94 by means of, for example, a depression in flange 94 at its axis of rotation or by means of external wheels or rollers 102 bearing on the shaft tube 96, as shown in FIG. 13. The second propeller shaft portion is then rotated whilst operating with a cutting tool on the surface(s) of flange 94 adapted to register with flange 93. When the flanges 93 and 94 are then secured together, the axes of rotation of the respective portions of the propeller shaft will be essentially in alignment.

Obviously, many modifications can be made in the preferred aspects of this invention as described above, for example, by substitution of mechanically equivalent elements, such as by driving the pump by means other than the rotary member. Equally obviously, the output from the pump (at maximum speed), the degree of compressibility of the bellows piston (if used), and the cross-sectional areas of the parts, must be balanced, if a build-up of back pressure is to be obviated on operation of the retarder.

We claim:

1. An hydraulically operable friction brake of the kind wherein the hydraulic liquid also provides the medium for removing the heat generated during operation of the brake, comprising (i) a casing, (ii) a rotary member mounted in the casing, (iii) a pressure-operable retarding device arranged and adapted to act upon the rotary member to generate retarding torque, (iv) a pump for circulating hydraulic liquid, (v) two separate fluid circuits provided between the pump and the retarding device one being an actuating circuit arranged and adapted to operate the retarding device, and (vi) valve means comprising (a) a valve member, (b) a first valve element secured to said member, (c) a second valve element slidable on said member and urged away from the first valve element by a spring and constituting pressure sensitive means arranged and adapted to control distribution of flow of hydraulic liquid between the two circuits, and (d) means for equilibrating hydraulic pressure across the valve means.

2. A friction brake according to claim 1, wherein the means for equilibrating hydraulic pressure comprises a passage in the valve member permitting flow there through of hydraulic liquid in said one circuit.

3. A friction brake according to claim 1, wherein the means for equilibrating hydraulic pressure comprises a by-pass from the outlet of the pump to a surface of said first valve element remote from the second valve element, wherby the by-pass is opened on actuation of the valve means.

4. A friction brake according to claim 1, wherein the other of said circuits is in part external of the casing and includes cooling means in the form of at least one heat exchanger mounted on the casing.

5. A friction brake according to claim 2, wherein the valve means comprises a body member defining a bore, said valve member is in the form of a rod freely passing through said bore, and said first and second valve elements are in the form of pistons which are each a sealing, sliding fit within the bore to define a first space above the first valve element and an intermediate space between said elements, said passage interconnecting the outlet of said pump with said first space, said intermediate space being vented to the interior of the casing wherby hydraulic liquid may be directed from the pump outlet, through the other of said circuits and thereby to the inlet of said pump.

6. A friction brake according to claim 1, wherein the spring is of a compressive strength such that in operation of the brake the second valve element is capable of movement towards the first valve element to an extent which will maintain substantially constant the pressure in the outlet of the pump over a wide speed range during operation of the brake.

7. A friction brake according to claim 1, wherin the spring is of a compressive strength such that the second valve element is capable of relatively small movement towards the first valve element whereby the pressure in the outlet of the pump will tend to be proportional to the square of the speed of the rotary member.

8. A friction brake according to claim 1, including a pressure relief device arranged and adapted to vent into the internal part of said other circuit hydraulic fluid from the external cooling part of predetermined maximum pressure.

9. A friction brake according to claim 1, including a bellows device arranged and adapted to act upon hydraulic liquid within the casing so as to maintain the hydraulic liquid at a predetermined pressure.

10. A friction brake according to claim 1, wherein the retarding device includes a piston in the form of an annular bellows and the actuating circuit includes means for supplying hydraulic liquid to the interior of the bellows on actuation of the brake, to expand the bellows and thereby activate the retarding device.

11. A friction brake according to claim 1, wherein the valve means is actuable by means of a movable actuator rod is sealed to the casing by means including a liquid-tight bellows.

12. A friction brake according to claim 1, including a thermally sensitive element arranged and adapted to perform a function selected from (a) reducing the hydraulic pressure and (b) causing reduction of the hydraulic pressure, acting on the retarding device during operation of the brake, when the hydraulic liquid attains a predetermined elevated temperature.

* * * * *